US010233062B2

(12) United States Patent
Cheng

(10) Patent No.: US 10,233,062 B2
(45) Date of Patent: Mar. 19, 2019

(54) MULTIFUNCTIONAL VEHICLE LIFTING, STEERING, MOVING AND OBSTACLE CROSSING DEVICE

(71) Applicant: Xunye Cheng, Wenzhou (CN)

(72) Inventor: Xunye Cheng, Wenzhou (CN)

(*) Notice: Subject to any disclaimer, the term of this patent is extended or adjusted under 35 U.S.C. 154(b) by 71 days.

(21) Appl. No.: 15/697,447

(22) Filed: Sep. 7, 2017

(65) Prior Publication Data

US 2017/0362068 A1 Dec. 21, 2017

Related U.S. Application Data

(63) Continuation of application No. PCT/CN2016/000119, filed on Mar. 8, 2016.

(30) Foreign Application Priority Data

Mar. 10, 2015 (CN) .......................... 2015 1 0103080

(51) Int. Cl.
B66F 9/075 (2006.01)
B66F 7/28 (2006.01)
B60P 1/02 (2006.01)
B66F 7/06 (2006.01)
B66F 7/08 (2006.01)
B60P 3/06 (2006.01)
(Continued)

(52) U.S. Cl.
CPC .......... B66F 9/07586 (2013.01); B60P 1/022 (2013.01); B60P 1/025 (2013.01);
(Continued)

(58) Field of Classification Search
CPC ...... B66F 1/00; B66F 3/22; B66F 5/00; B66F 7/065
See application file for complete search history.

(56) References Cited

U.S. PATENT DOCUMENTS 6,537,017 B2 * 3/2003 Stone ....................... B65G 1/07
187/269
7,383,923 B2 * 6/2008 Patten ..................... B66F 7/065
108/105
(Continued)

FOREIGN PATENT DOCUMENTS

CA 2757882 A1 11/2010
CN 2486532 Y 4/2002
(Continued)

Primary Examiner — Lee D Wilson
(74) Attorney, Agent, or Firm — Wayne & Ken, LLC; Tony Hom

(57) ABSTRACT

The present invention discloses a multifunctional vehicle lifting, steering, moving and obstacle crossing device. The apparatus is composed of a rotating mechanism, a lifting mechanism, a running mechanism and a control mechanism, is mounted at a bottom of an automobile, can be conveniently folded at the bottom of the automobile when not used at ordinary times, and has characteristics of portability, flexibility, no space occupation and easy operation. The apparatus can realize functions of a vehicle, such as lifting, rotating, moving and the like, in a wired or wireless control manner, and effectively overcome defects that the vehicle cannot realize four-wheel off-ground, entire side movement and in-situ rotation or pass through a narrow road or stride across a wide ditch or cross a high and narrow obstacle, thereby completing relatively difficult tasks of the vehicle, such as parking, moving, turning-around and turning in a narrow space, crossing ditches etc.

11 Claims, 18 Drawing Sheets

(51) Int. Cl.
*B60R 19/54* (2006.01)
*B62D 55/00* (2006.01)

(52) U.S. Cl.
CPC ............ *B66F 7/065* (2013.01); *B66F 7/0625* (2013.01); *B66F 7/0633* (2013.01); *B66F 7/0658* (2013.01); *B66F 7/08* (2013.01); *B66F 7/28* (2013.01); *B60B 2340/70* (2013.01); *B60B 2900/551* (2013.01); *B60P 3/06* (2013.01); *B60R 19/54* (2013.01); *B62D 55/00* (2013.01); *B66F 9/07568* (2013.01)

(56) References Cited

U.S. PATENT DOCUMENTS

2003/0168646 A1* 9/2003 Lopez Alba ............ A47B 9/16
254/122

2011/0262261 A1* 10/2011 Stewart ................ B66F 7/0625
414/800

2017/0362068 A1* 12/2017 Cheng ................ B66F 9/07586

FOREIGN PATENT DOCUMENTS

| | | |
|---|---|---|
| CN | 101736106 A | 6/2010 |
| CN | 201619997 U | 11/2010 |
| CN | 201932877 U | 8/2011 |
| CN | 201960560 U | 9/2011 |
| CN | 202245926 U | 5/2012 |
| CN | 102887137 A | 1/2013 |
| CN | 202829449 U | 3/2013 |
| CN | 203212283 U | 9/2013 |
| CN | 103407930 A | 11/2013 |
| CN | 104609335 A | 5/2015 |
| CN | 204549939 U | 8/2015 |
| DE | 20313940 U1 | 11/2003 |
| EP | 1384697 A1 | 1/2004 |
| JP | 2003341988 A | 12/2003 |

* cited by examiner ns as follows: the multifunctional vehicle lifting, steering, moving and obstacle crossing device includes a rotating mechanism, a lifting mechanism, a running mechanism and a control mechanism. An upper part of the rotating mechanism is mounted on a lower plane of a vehicle chassis; a lower part of the rotating mechanism is connected with an upper end of the lifting mechanism; a lower part of the lifting mechanism is connected with the running mechanism, and preferably, positions of the rotating mechanism and the lifting mechanism are changeable; a main body of the control mechanism is mounted on the rotating mechanism or the lifting mechanism or a body mountable part; the control mechanism is connected with a driving motor at each part and an external information receiving device through circuits; and the entire multifunctional vehicle lifting, steering, moving and obstacle crossing device can be controlled in a wired or wireless manner. At ordinary times, the lifting mechanism of the multifunctional vehicle lifting, steering, moving and obstacle crossing device in the present invention is folded and tightly attached to the vehicle chassis entirely in a flat form, thereby avoiding influencing normal running of the vehicle.

MULTIFUNCTIONAL VEHICLE LIFTING, STEERING, MOVING AND OBSTACLE CROSSING DEVICE

TECHNICAL FIELD

The present invention relates to a vehicle assistance apparatus, and particularly relates to an apparatus for realizing overall lifting, omnidirectional rotating and moving and obstacle crossing of a vehicle.

BACKGROUND

With the rapid development of an economic society, the human living standard is increasingly improved, and a vehicle serving as a main transportation means for human travel is quite popular. The vehicle not only provides travel convenience for people, but also brings a driving pleasure to a driver. However, with the continuous increase of vehicles, problems of parking difficulty, running difficulty and the like appear constantly, and a lot of troubles are brought to people as follows: the vehicle cannot normally go in and out due to insufficient residual road parking length; the vehicle cannot turn around due to an extremely small site or space; the vehicle cannot make a turn due to a sharp turn; the vehicle cannot intersect or pass due to an extremely narrow rural road surface; the vehicle cannot cross part of obstacles; the vehicle cannot be transferred to a safety zone in time due to midway breakdown, and the like. Traffic accidents may be caused if some conditions are improperly handled. At present, a vehicle is generally designed as follows: four wheels are down to the ground, lengths of a wheel track and a wheel base and a height of a chassis are constant, and the vehicle only can go forward and backward and run to left front, left rear, right front and right rear, has a large turning radius and does not have functions of performing overall side movement and in-situ rotation or passing through a road surface narrower than the wheel base, a ditch wider than a wheel diameter and crossing obstacles. Therefore, a novel apparatus is urgently needed to overcome and solve the above problems.

SUMMARY

A purpose of the present invention is to provide a multifunctional vehicle lifting, steering, moving and obstacle crossing device. The apparatus overcomes defects that a vehicle has constant wheel position and chassis height during use, only can go forward and backward and run to left front, left rear, right front and right rear and cannot realize four-wheel off-ground, overall side movement and in-situ rotation or pass through a narrow road, a wide ditch and a high and narrow obstacle, thereby effectively increasing maneuvering performance of the vehicle, particularly increasing overall lifting, omnidirectional steering, moving and obstacle-crossing capabilities of the vehicle, and effectively avoiding complicated operations brought by use of a jack and other lifting tools during tire changing. Therefore, the apparatus in the present invention is required to simultaneously have functions of lifting, rotation, running, convenient carrying, actual operation and control and the like.

The present invention is realized through technical solutions as follows: the multifunctional vehicle lifting, steering, moving and obstacle crossing device includes a rotating mechanism, a lifting mechanism, a running mechanism and a control mechanism. An upper part of the rotating mechanism is mounted on a lower plane of a vehicle chassis; a Preferably, the driving motor is a hydraulic motor.

When the vehicle needs to perform overall side movement, for the multifunctional vehicle lifting, steering, moving and obstacle crossing device in the present invention, the rotating mechanism rotates under control of the control mechanism, to drive the lifting mechanism and the running mechanism to rotate to a preset side movement direction, and the lifting mechanism is extended to support the entire vehicle body, so that the wheels leave the ground, and the running mechanism runs to an assigned direction according to a control instruction. When the vehicle needs to change a direction in a running process, change of the direction can be realized through a speed difference or reverse rotation of roller groups or transmission belt plates on left and right sides of the running mechanism under control of the control mechanism.

When the vehicle needs to rotate in situ or turn around, for the multifunctional vehicle lifting, steering, moving and obstacle crossing device in the present invention, the lifting mechanism is extended to support the entire vehicle body under the control of the control mechanism, so that the wheels leave the ground, and the rotating mechanism drives the vehicle body to rotate according to a preset angle or a manual operation.

When the vehicle needs to pass through a narrow road surface, for the multifunctional vehicle lifting, steering, moving and obstacle crossing device in the present invention, the lifting mechanism is extended to support the entire vehicle body under the control of the control mechanism, so that the wheels leave the ground, and the vehicle runs by virtue of the running mechanism.

When the vehicle needs to cross the high and narrow obstacle having a width smaller than a transverse or longitudinal spacing between the multifunctional vehicle lifting, steering, moving and obstacle crossing device in the present invention and the wheel, for the multifunctional vehicle lifting, steering, moving and obstacle crossing device in the present invention, the lifting mechanism is extended to support the entire vehicle body under the control of the control mechanism, so that the chassis is higher than the obstacle, and the vehicle runs by virtue of the running mechanism, or the vehicle body is rotated by 90 degrees by using the rotating mechanism and then transversely runs according to needs; and therefore, the obstacle passes through a gap between the apparatus in the present invention and the wheel.

When the vehicle needs to pass through a wide ditch which is not wider than a longitudinal distance between the wheel and the multifunctional vehicle lifting, steering, moving and obstacle crossing device in the present invention, for the multifunctional vehicle lifting, steering, moving and obstacle crossing device in the present invention, the lifting mechanism is extended to support the entire vehicle body under the control of the control mechanism, so that the wheels leave the ground, and the vehicle runs by virtue of the running mechanism until front wheels or rear wheels run across the ditch; then the lifting mechanism is retracted; the vehicle is laid down; the vehicle normally runs to the apparatus in the present invention and then passes through the ditch; and the above actions are repeated to enable the vehicle to be continuously driven until the rear wheels or the front wheels of the vehicle stride across the ditch.

BENEFICIAL EFFECTS

The present invention has advantages as follows:
1. The present invention is directly mounted below a vehicle chassis, is convenient to use and does not increase extra burden and workloads such as carrying, transporting, loading and unloading, etc.;
2. The present invention is small in thickness when retracted at ordinary times, is tightly attached to the chassis and does not influence normal running of the vehicle;
3. Multiple functions of the vehicle, such as lifting, steering, moving, obstacle crossing and the like can be realized, thereby bringing a lot of convenience to driving travel; and
4. The present invention can be fully automatically and digitally controlled and visually operated and is easy, flexible and manoeuvrable to operate.

BRIEF DESCRIPTION OF DRAWINGS

The apparatus in the present invention has multiple embodiments. In order to describe technical solutions of embodiments in the present invention more clearly, drawings of four embodiments are illustrated and briefly described below only according to differences of lifting mechanisms.

Figure 1:
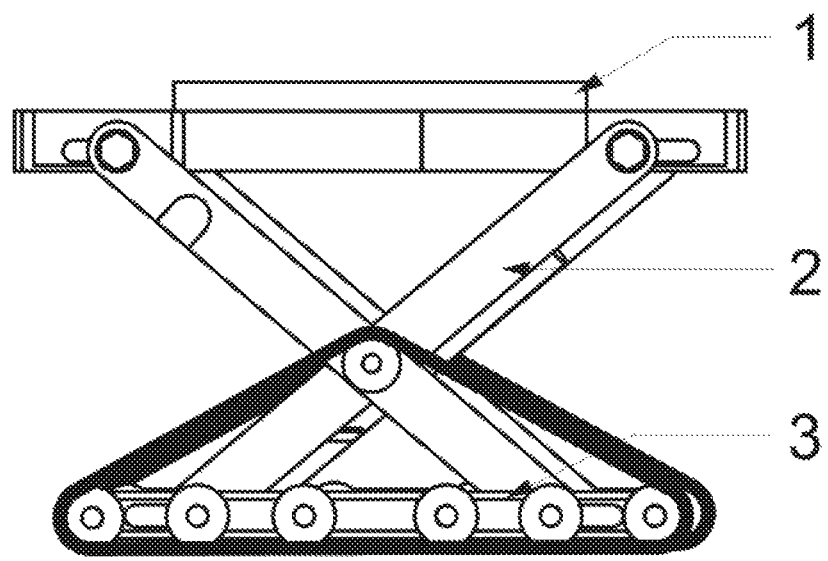
FIG. 1 and FIG. 2 are overall structural stretched schematic diagrams of a screw mechanical lifting type in embodiment 1 of an apparatus of the present invention.
Figure 2:
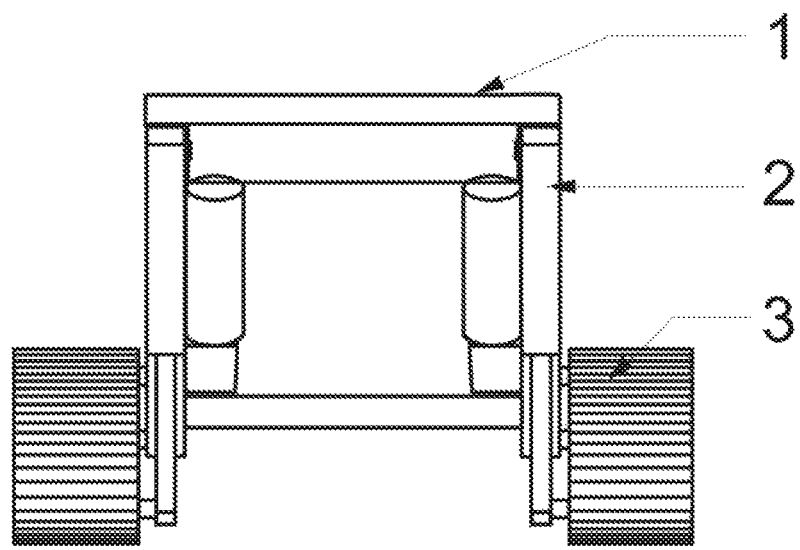
Figure 3:
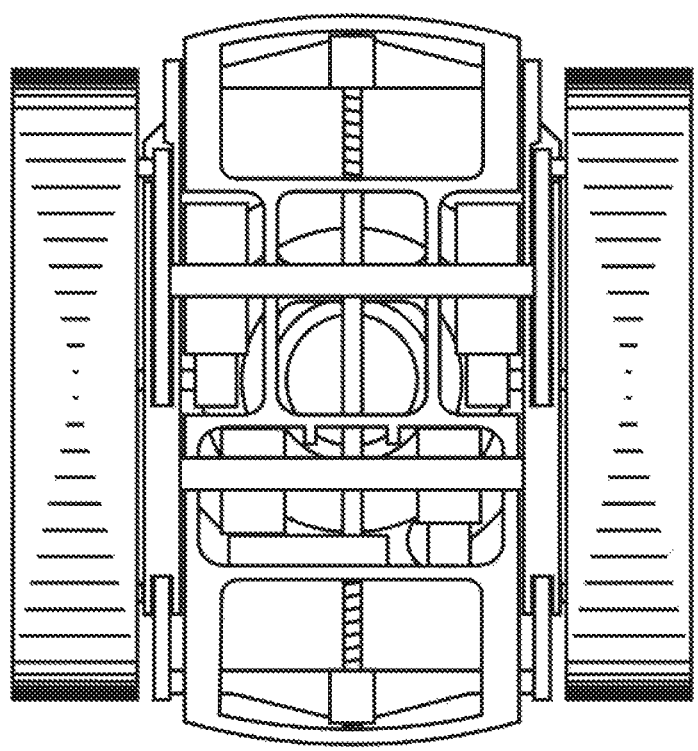
FIG. 3 is an overall structural retracted schematic diagram of a screw mechanical lifting type in embodiment 1 of an apparatus of the present invention.
Figure 4:
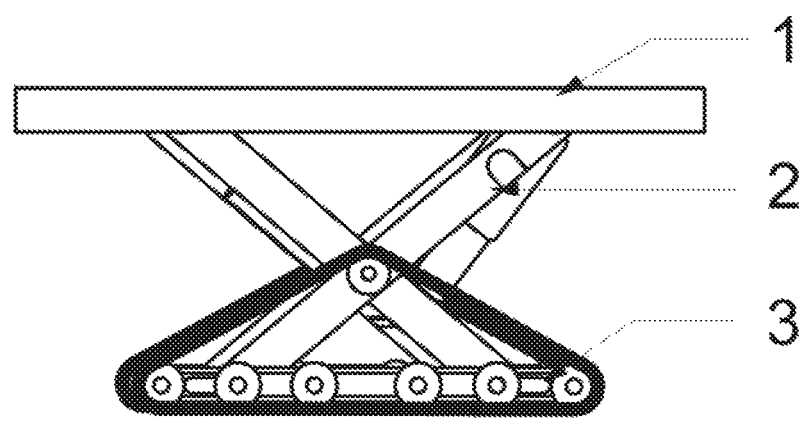
FIG. 4 and FIG. 5 are overall structural stretched schematic diagrams of a hydraulic lifting type in embodiment 2 of an apparatus of the present invention.
Figure 5:
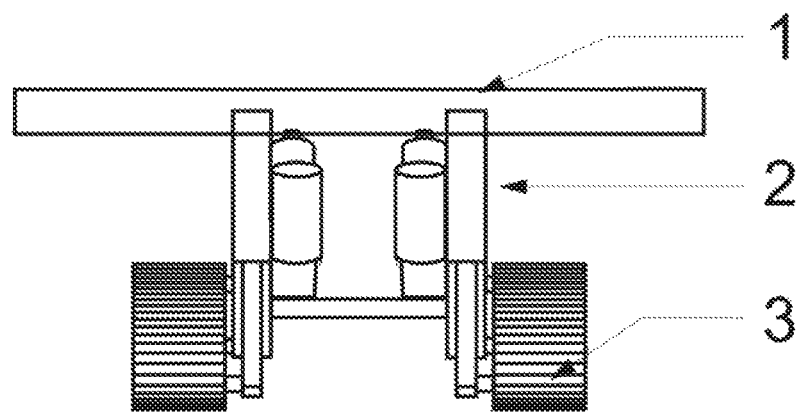
Figure 6:
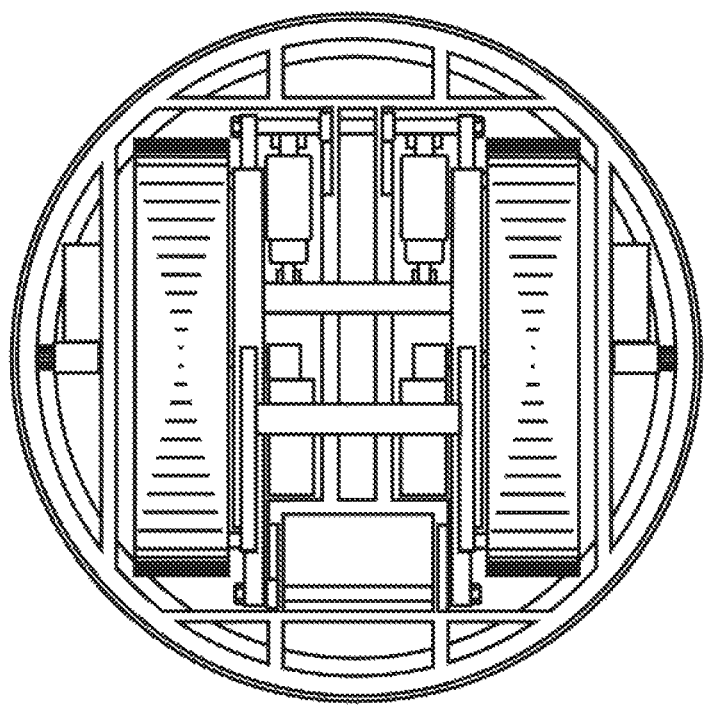
FIG. 6 is an overall structural retracted schematic diagram of a hydraulic lifting type of in embodiment 2 of an apparatus of the present invention.

LIST OF REFERENCE NUMERALS 1. rotating mechanism; 2. lifting mechanism; 3. running mechanism; 4. rotating component; 5. driving motor; 6. gear ring; 7. bracket; 71. chute; 8. transverse rod; 9. transmission gear; 10. hydraulic ejector rod; 11. straight rod; 12. transverse rod; 13. bolt; 14. pulley; 15. spiral screw; 151. nut; 16. rivet; 17. running assembly; 20. upper half box of pneumatic lifting mechanism; 21. airbag; 22. "X"-shaped movable fastener; 23. air pump; 24. lower half box of pneumatic lifting mechanism; 26. pulley; 28. steel wire; 29. return spring; 30. transmission rod; 31. transmission assembly; 32. roller group; 33. transmission belt; 34. transmission belt plate; 35. program control circuit; 36. rotating mechanism driver; 37. lifting mechanism driver; 38. running mechanism driver; 39. wired controller; 40. wireless transmitter/receiver; 41. wireless controller; 42. angle inductor; 43. geomagnetic inductor; 44. video receiver; 101. control mechanism; 201. screw mechanical lifting mechanism; 202. hydraulic lifting mechanism; and 203. pneumatic lifting mechanism.

DETAILED DESCRIPTION

The present invention discloses a multifunctional vehicle lifting, steering, moving and obstacle crossing device capable of well overcoming defects of a vehicle during use, thereby effectively increasing maneuvering flexibility of the vehicle and practically improving vehicle lifting, steering, moving and obstacle-crossing capabilities.

Technical solutions in embodiments of the present invention are clearly and completely described below in combination with drawings in embodiments of the present invention. Apparently, the described embodiments are only part of embodiments of the present invention rather than all of embodiments of the present invention. Based on embodiments in the present invention, all other embodiments obtained by those ordinary skilled in the art on premise of not making creative work belong to a protection scope of the present invention.

The multifunctional vehicle lifting, steering, moving and obstacle crossing device comprises:

as shown in FIGS. 1-18: a rotating mechanism 1, a lifting mechanism 2, a running mechanism 3 and a control mechanism 101, wherein an upper part of the rotating mechanism 1 is mounted on a lower plane of a vehicle chassis; a lower part of the rotating mechanism 1 is connected with an upper end of the lifting mechanism 2; a lower part of the lifting mechanism 2 is connected with the running mechanism 3;

and the control mechanism 101 is mounted on the rotating mechanism 1 or the lifting mechanism 2 or a body mountable part.

Figure 11:
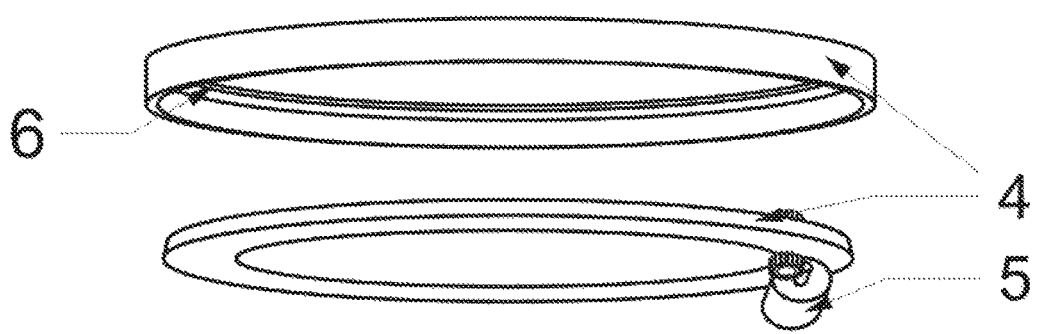
FIG. 11 is a decomposition diagram of a rotating mechanism of an apparatus in the present invention.
Figure 12:
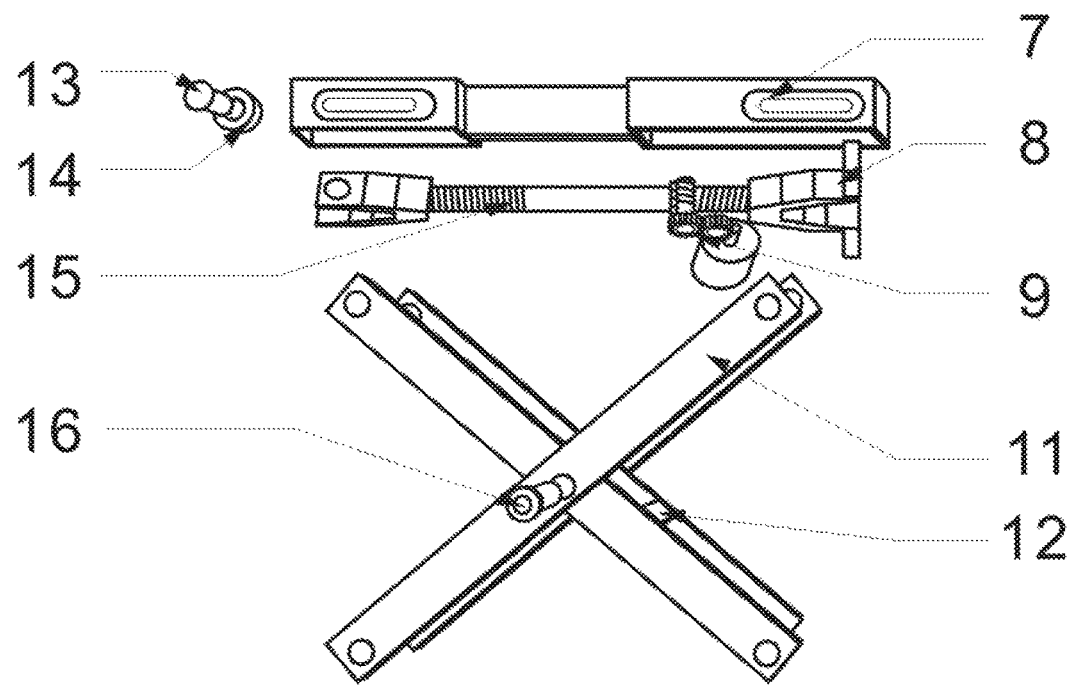
FIG. 12 is a decomposition diagram of a lifting mechanism in a screw mechanical lifting type in embodiment 1 of an apparatus of the present invention.
Figure 13:
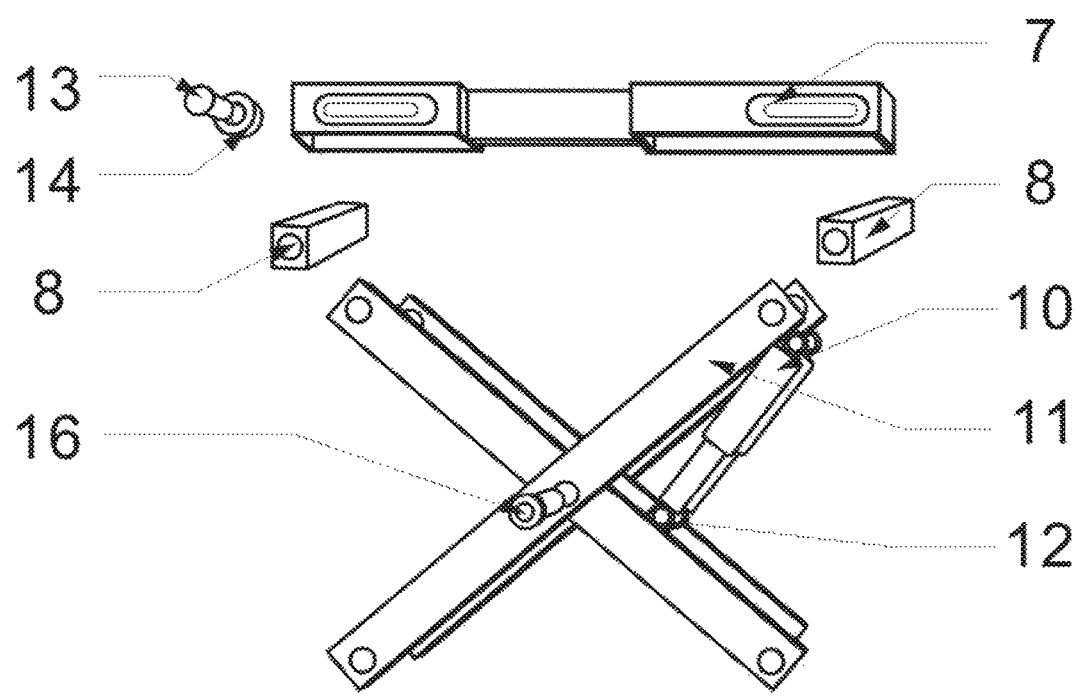
FIG. 13 is a decomposition diagram of a lifting mechanism in a hydraulic lifting type in embodiment 2 of an apparatus of the present invention.

As shown in FIG. 11, the rotating mechanism 1 at least includes two rotating components 4, wherein two rotating components 4 can mutually rotate around a central common point along a plane direction, and are preferably rotating bearings; one of the rotating components 4 is provided with a gear ring 6, the other rotating component 4 is provided with a driving motor 5 and a transmission gear 9, and the transmission gear 9 at a tail end is in meshed link with the gear ring 6; and when rotation is needed, the driving motor 5 rotates forwards or reversely according to an instruction of the control mechanism 101, and the gear ring 6 of the rotating mechanism 1 is driven to rotate through the transmission gear 9.

As shown in FIGS. 1 and 12-15, the lifting mechanism 2 comprises any one form of three lifting mechanism forms of a screw mechanical lifting mechanism 201, a hydraulic lifting mechanism 202 and a pneumatic lifting mechanism 203. When retracted, the lifting mechanism 2 can be positioned on the same plane as the rotating mechanism 1 and the running mechanism 3, or is positioned on the same plane as the running mechanism 3 and tightly attached to a lower edge of the rotating mechanism.

Embodiment 1

As shown in FIGS. 1, 2, 3 and 12, the screw mechanical lifting mechanism 201 comprises a plurality of groups of straight rod 11 structures, preferably two groups, wherein each group of straight rods 11 comprises two straight rods; middles of the straight rods are riveted into shear-type cross structures by rivets 16; pulleys 14 and brackets 7 with chutes are arranged at upper ends of the straight rods 11; the brackets 7 are used for being mounted and connected with the rotating mechanism 1; and the pulleys 14 can freely slide in the chutes 71 along a shear plane. The two groups of straight rod 11 structures are in a mirror arrangement manner by taking the shear plane as a mirror surface and mounted in parallel, and middles of two straight rods 11 on an inner side are fixedly connected through the transverse rods. The pulleys are connected with the transverse rods 8 through bolts 13, the two transverse rods 8 are movably linked by a spiral screw 15 through a nut 151, and the screw 15 is linked with the driving motor 5 through the transmission gear 9. When the mechanism needs to be extended, the driving motor 5 rotates forwards or reversely according to the instruction of the control mechanism 101, the screw 15 is driven to rotate through the transmission gear 9, the transverse rods 8 on two sides are pulled, upper ends of the straight rods 11 are driven to approach middles through the transverse rods 8, and the groups of the straight rods 11 make a shear-type motion to support the vehicle. Similarly, the driving motor 5 rotates forwards or reversely, and the screw mechanical lifting mechanism 201 is retracted.

Embodiment 2

As shown in FIGS. 4, 5, 6 and 13, compared with the screw mechanical lifting mechanism 201, the hydraulic lifting mechanism 202 reduces the driving motor 5, the transmission gear 9 and the spiral screw 15 and installs hydraulic ejector rods 10. One end of each of the hydraulic ejector rods 10 is mounted on the transverse rods 8 or the brackets 7 on one side, and other end of each of the hydraulic ejector rods 10 are mounted on another transverse rod 12. Other structures of the hydraulic lifting mechanism 202 are the same as those of the screw mechanical lifting mechanism 201. When the hydraulic ejector rods 10 are extended, the vehicle is supported; and when the hydraulic ejector rods 10 are retracted, the hydraulic lifting mechanism 202 is retracted.

Embodiment 3

Figure 7:
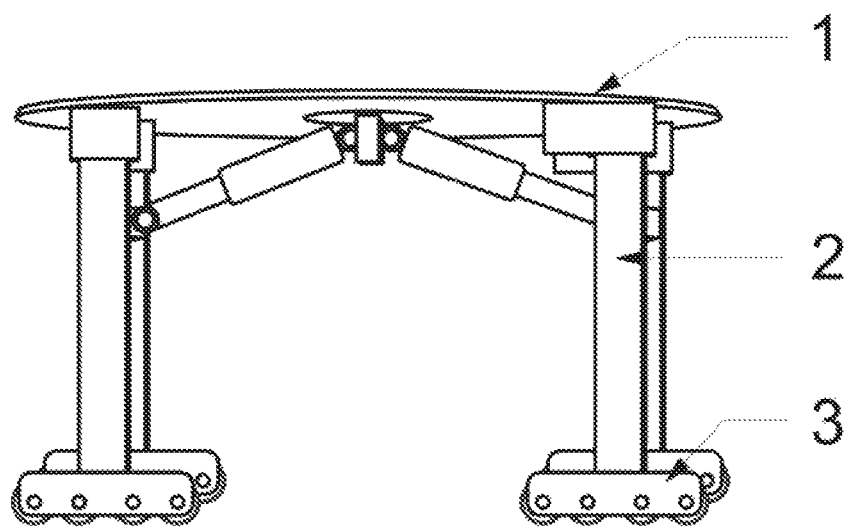
FIG. 7 is an overall structural stretched schematic diagram of a hydraulic lifting type in embodiment 3 of an apparatus of the present invention.
Figure 8:
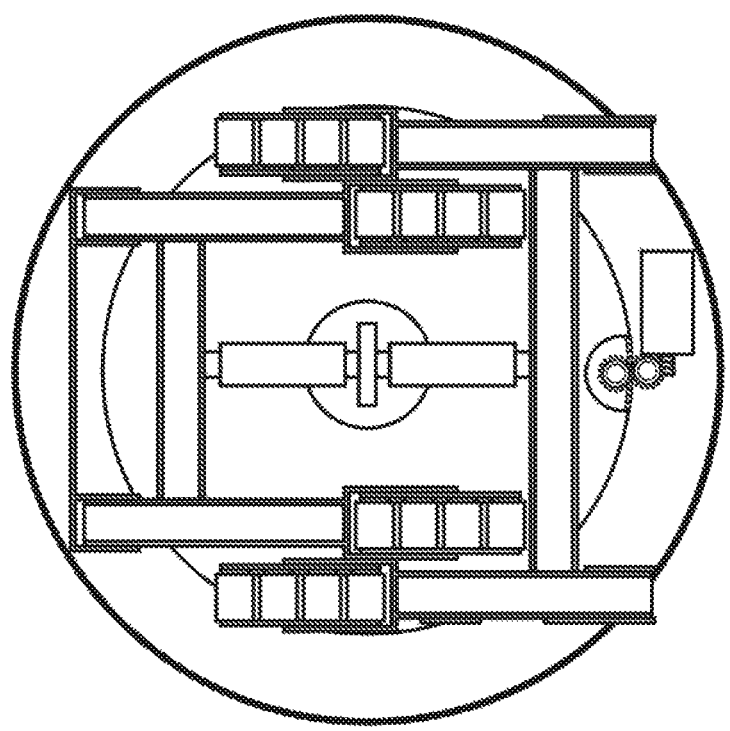
FIG. 8 is an overall structural retracted schematic diagram of a hydraulic lifting type in embodiment 3 of an apparatus of the present invention.
Figure 14:
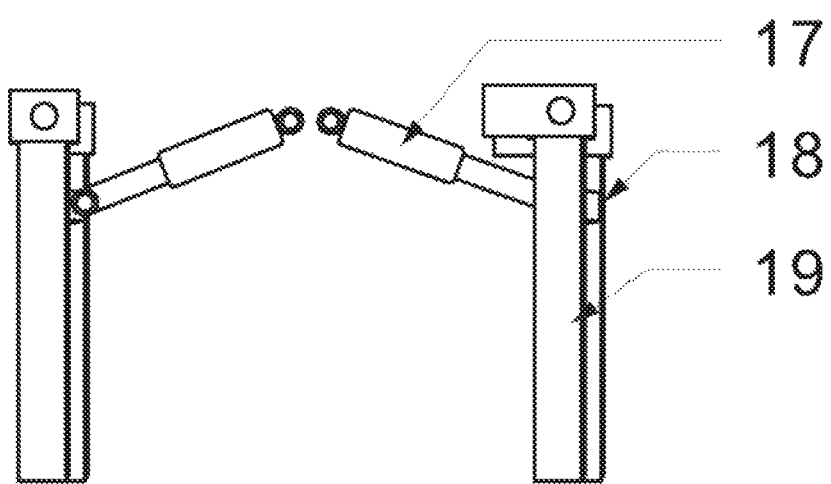
FIG. 14 is a decomposition diagram of a lifting mechanism in a hydraulic lifting type in embodiment 3 of an apparatus of the present invention.

As shown in FIGS. 7, 8 and 14, the hydraulic lifting mechanism 202 comprises a plurality of groups of "H"-shaped structures formed by connecting the straight rods 11 and the transverse rods 12, preferably two groups; the straight rods 11 of the "H"-shaped structures can be stretched; the two groups of the "H"-shaped structures are in a mirror arrangement manner by taking a large plane as a mirror surface, upper ends of the "H"-shaped structures are mounted on the rotating mechanism 1, and lower ends of the "H"-shaped structures can inwards swing opposite to each other in an angle of 90 degrees; hydraulic ejector rods 10 are respectively mounted on the transverse rods 12 of each group of the "H"-shaped structures; and the other end of each of the hydraulic ejector rods 10 are mounted on a bottom plate positioned in a middle of the two groups of the "H"-shaped structures on the rotating mechanism 1. When the hydraulic lifting mechanism 202 needs to be extended, the hydraulic ejector rods 10 are extended according to the instruction of the control mechanism 101, and the "H"-shaped structures are driven to rotate downwards to support the vehicle. Similarly, the hydraulic ejector rods 10 are retracted, and then the hydraulic lifting mechanism 202 is retracted.

Embodiment 4

Figure 9:
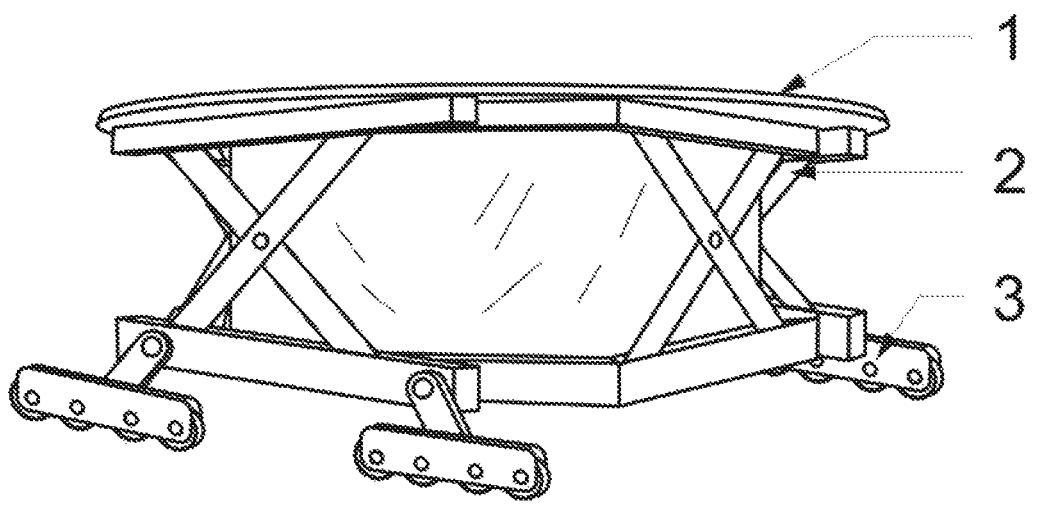
FIG. 9 is an overall structural stretched schematic diagram of a pneumatic lifting type of in embodiment 4 of an apparatus of the present invention.
Figure 10:
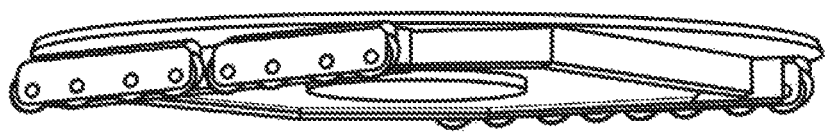
FIG. 10 is an overall structural retracted schematic diagram of a pneumatic lifting type in embodiment 4 of an apparatus of the present invention.
Figure 15:
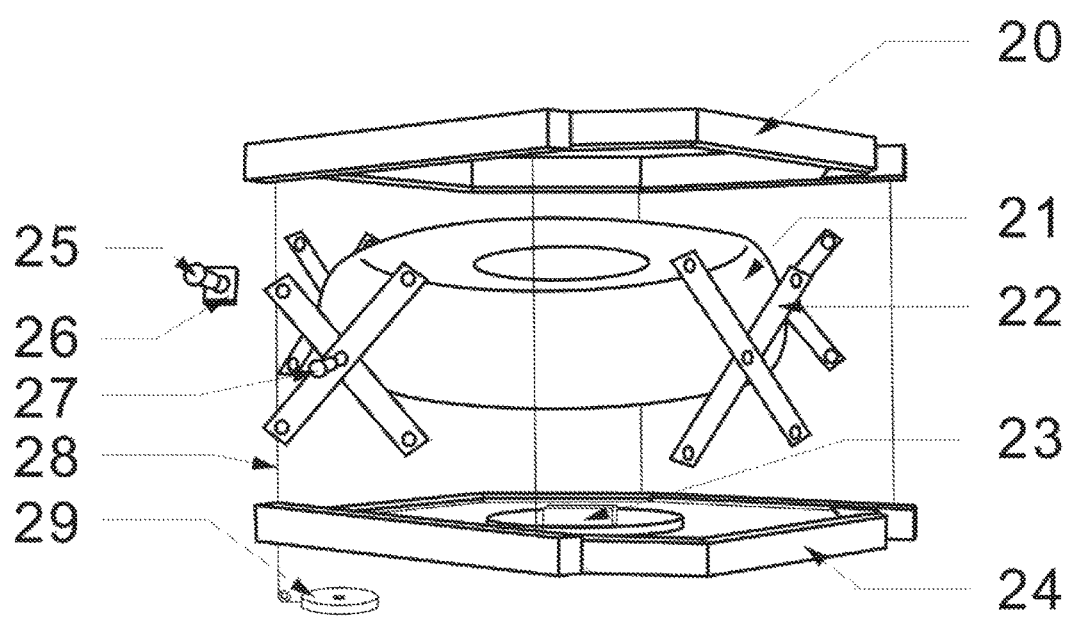
FIG. 15 is a decomposition diagram of a lifting mechanism in a pneumatic lifting type in embodiment 4 of an apparatus of the present invention.

As shown in FIGS. 9, 10 and 15, the pneumatic lifting mechanism 203 is as follows: a box-shaped pneumatic lifting mechanism 203 is formed by two upper and lower half boxes which are thick in side and thin in interior opposite to each other in parallel, that is, an upper half box 20a of a polygonal pneumatic lifting mechanism and a lower half box 24a of a pneumatic lifting mechanism; and an airbag 21 is arranged in a middle of the two half boxes. Chutes are respectively formed in thick parts at peripheries of the upper half box 20 of the pneumatic lifting mechanism and the lower half box 24 of the pneumatic lifting mechanism, and are movably connected respectively with upper and lower ends of "X"-shaped movable fasteners 22 achieving a balancing effect through pulleys 26 and the rivets 16. Each group of the "X"-shaped movable fasteners 22 is respectively composed of two flat straight rods 11, are riveted in centers by the rivets, and can make a shear-type motion. An air pump 23 is arranged in a middle of the lower half box 24 of the pneumatic lifting mechanism, a mounting position of the driving motor 5 of the running mechanism 3 is reserved at a periphery, a return spring 29 is arranged at a bottom of the pneumatic lifting mechanism lower half box 24, and one end of the return spring 29 is connected with the upper half box 20 of the pneumatic lifting mechanism through a steel wire 28. When the pneumatic lifting mechanism 203 needs to be extended, the air pump 23 is operated or air pickup valves of an air storage tank and an exhaust pipe of an automotive are opened, the airbag 21 is supported to drive the "X"-shaped movable fasteners 22 to be extended downwards, and the pneumatic lifting mechanism 203 is opened to jack the vehicle. The airbag 21 is deflated according to the instruction of the control mechanism 101, and then the pneumatic lifting mechanism 203 is reset under actions of the return spring 29 and the steel wire 28.

Figure 16:
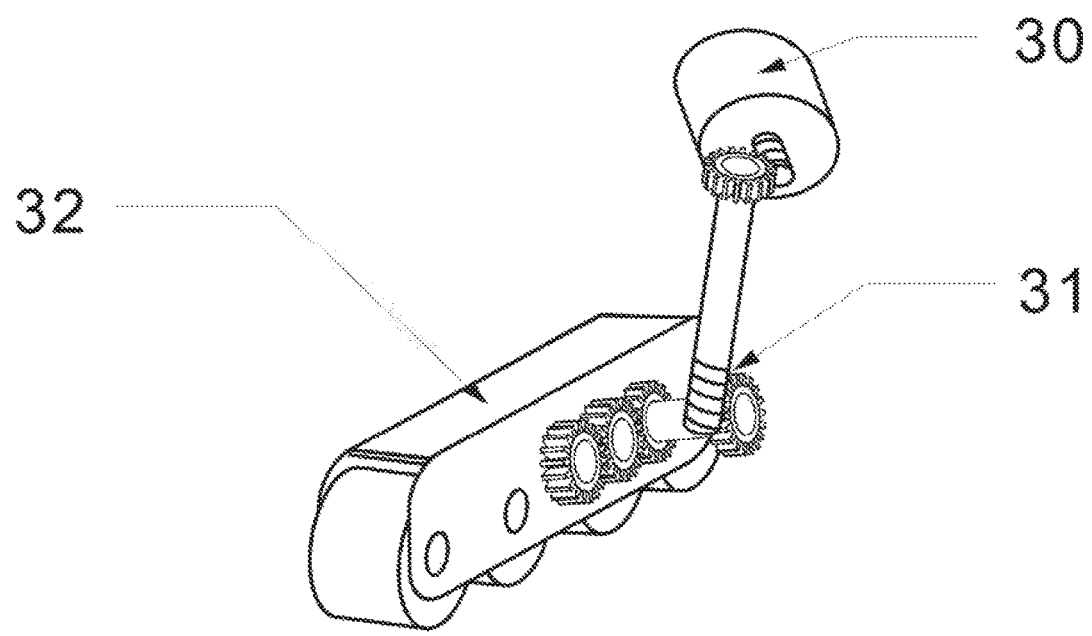
FIG. 16 and FIG. 17 are decomposition diagrams of a running mechanism of an apparatus in the present invention.
Figure 17:
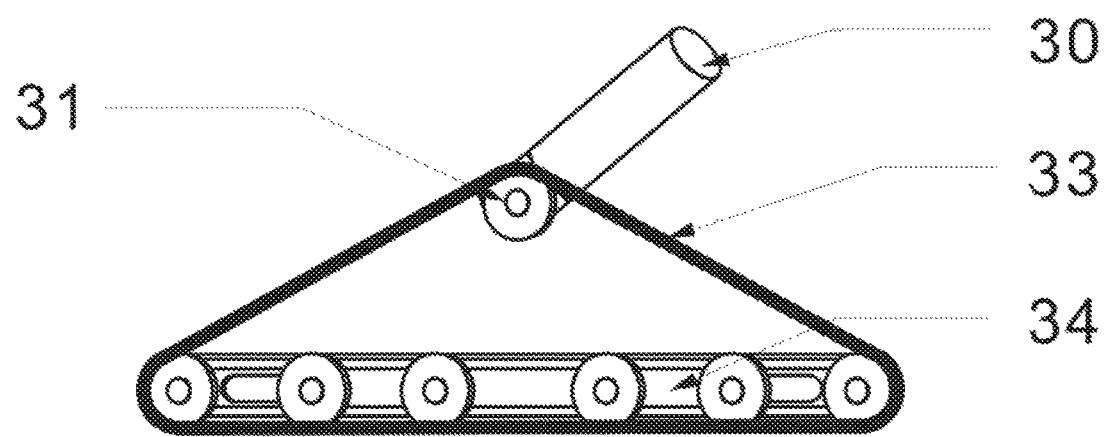

As shown in FIGS. 16 and 17, the running mechanism 3 comprises a driving motor 30, a transmission assembly 31 and a running assembly 17. The running assembly comprises a roller group 32, transmission belts 33 and transmission belt plates 34. The driving motor 5 is linked with the transmission assembly 31 through a transmission rod 30, and the transmission assembly 31 is linked with the running assembly 17. The transmission assembly 31 may be composed of one or more of a transmission shaft, a worm gear and worm, a gear set, a chain wheel and chain set and a track. The running assembly adopts a roller or a crawler wheel, and preferably is composed of the crawler wheel and a mounting piece, and a roller group may include a single roller or a plurality of rollers. Running mechanisms 3 of the multifunctional vehicle lifting, steering, moving and obstacle crossing device in the present invention generally include four groups or two groups. Each set of running mechanism 3 in the four groups comprises one driving motor 5, one transmission assembly 31 and one running assembly 17 respectively. Each set of running mechanism 3 in the two groups comprises one driving motor 5, one or two transmission assemblies 31 and one or two running assemblies 17. When driving directions on two sides are consistent, the running mechanisms 3 drive the vehicle to go forwards or backwards; when the driving directions on two sides are opposite to each other, the running mechanisms 3 drive the vehicle to rotate; and when the driving directions on two sides consistent while speeds are inconsistent, the running mechanisms 3 drive the vehicle to turn and run.

Figure 18:
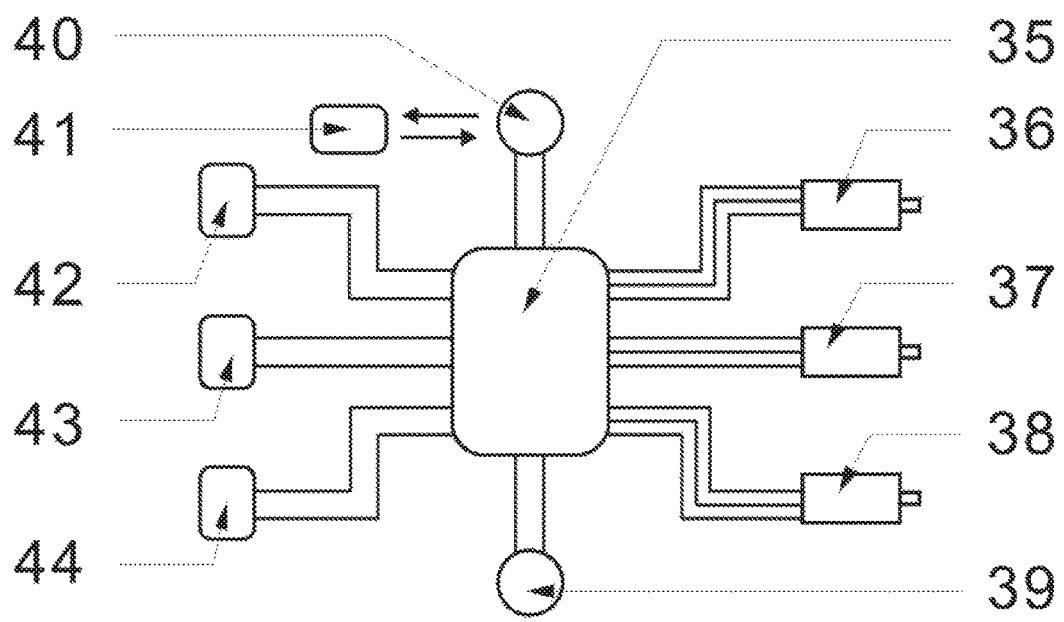
FIG. 18 is a schematic diagram of a control mechanism of an apparatus in the present invention.

As shown in FIG. 18, the control mechanism 101 comprises a program control circuit 35, a wireless transmitter/receiver 40, a wired controller 39 or a wireless controller 41 and preferably further comprises an angle inductor 42, a geomagnetic inductor 43, a video receiver 44 and an information receiving device. The program control circuit 35 is respectively connected with the angle inductor 42, the geomagnetic inductor 43, the video receiver 44, the wireless transmitter/receiver 40, the wired controller 39, the wireless controller, as well as the driving motor 5 at each part, a rotating mechanism driver 36, a lifting mechanism driver 37 and a running mechanism driver 38. The wired controller 39 is mounted in a cab, and a circuit of the wired controller 39 is connected with the program control circuit 35. The wireless controller 41 may be a special remote controller or a mobile phone. The wired controller 39 or the wireless controller of the mechanism is controlled in analog image, data and video manners automatically or manually. When a power supply is switched on, information of the angle inductor 42, the geomagnetic inductor 43 and the video receiver 44 is processed by the program control circuit 35 and then transmitted to a control panel through a wired or wireless apparatus; control personnel change data and graph directions and positions through a control panel visualization frame; and after the information is transmitted to the program control circuit 35 and processed by the program control circuit 35, each driving motor 5, or the rotating mechanism driver 36, the lifting mechanism driver 37 and the running mechanism driver 38 are instructed to operate, thereby completing the instruction.

What is claimed is:

1. A multifunctional vehicle lifting, steering, moving and obstacle crossing device, comprising a rotating mechanism, a lifting mechanism, a running mechanism and a control mechanism; wherein an upper part of the rotating mechanism is mounted on a lower plane of a vehicle chassis; a lower part of the rotating mechanism is connected with an upper end of the lifting mechanism; a lower end of the lifting mechanism is connected with the running mechanism; and the control mechanism is mounted on the rotating mechanism or the lifting mechanism or a body mountable part.

2. The multifunctional vehicle lifting, steering, moving and obstacle crossing device according to claim 1, wherein mounting positions of the rotating mechanism and the lifting mechanism are mutually changeable, and the rotating mechanism, the lifting mechanism and the running mechanism are connected into a whole with one another.

3. The multifunctional vehicle lifting, steering, moving and obstacle crossing device according to claim 1, wherein the rotating mechanism is composed of at least two rotating components, and the two rotating components rotates around a central common point along a plane direction.

4. The multifunctional vehicle lifting, steering, moving and obstacle crossing device according to claim 1, wherein the lifting mechanism comprises any one form of the following three forms: a screw mechanical lifting mechanism, a hydraulic lifting mechanism and a pneumatic lifting mechanism.

5. The multifunctional vehicle lifting, steering, moving and obstacle crossing device according to claim 1, wherein the lifting mechanism is composed of shear-type cross structures connected by straight rods, transverse rods, chutes, brackets with the chutes, slide blocks or pulleys, and spiral screws or hydraulic ejector rods.

6. The multifunctional vehicle lifting, steering, moving and obstacle crossing device according to claim 4, wherein the screw mechanical lifting mechanism is composed of straight rods, transverse rods, rivets, chutes, brackets with chutes, slide blocks or pulleys, spiral screws, a driving motor or a hydraulic motor and a transmission mechanism; the straight rods are riveted into shear-type cross structures by the rivets; the slide blocks or the pulleys are arranged at upper ends of the straight rods and freely slide in the chutes along a shear plane; the shear-type cross structures are in a mirror arrangement manner by taking the shear plane as a mirror surface and mounted in parallel; middles of two straight rods on an inner side are fixedly connected through the transverse rods; the slide blocks or pulleys in the same direction are connected by the transverse rods; the two transverse rods are hinged by a spiral screw structure; and the spiral screw is connected with the driving motor through the transmission mechanism.

7. The multifunctional vehicle lifting, steering, moving and obstacle crossing device according to claim 4, wherein the hydraulic lifting mechanism is composed of "H"-shaped structures formed by connecting the straight rods and the transverse rods, and hydraulic ejector rods; the "H"-shaped structures are in a mirror arrangement manner by taking a large plane as a mirror surface, upper ends of the "H"-shaped structures are mounted on the rotating mechanism, and lower ends of the "H"-shaped structures can inwards swing opposite to each other in an angle of 90 degrees; the hydraulic ejector rods are respectively arranged on the transverse rods of the "H"-shaped structures; and the other end of each hydraulic ejector rod is mounted on a bottom plate positioned in a middle of the two groups of "H"-shaped structures on the rotating mechanism.

8. The multifunctional vehicle lifting, steering, moving and obstacle crossing device according to claim 4, wherein the pneumatic lifting mechanism is of a box-shaped structure formed by two upper and lower half boxes which are thick in side and thin in interior opposite to each other in parallel, that is, an upper half box of a polygonal pneumatic lifting mechanism and a lower half box of the pneumatic lifting mechanism; an airbag is arranged in a middle of the two half boxes; peripheries of the upper half box of the pneumatic lifting mechanism and the lower half box of the pneumatic lifting mechanism are movably connected with upper and lower ends of "X"-shaped movable fasteners respectively; and gas in the airbag is taken from vehicle exhaust or an electric air pump or an air storage tank.

9. The multifunctional vehicle lifting, steering, moving and obstacle crossing device according to claim 1, wherein the running mechanism comprises a driving motor, a transmission assembly and a running assembly, and the driving motor is linked with the running assembly through the transmission assembly.

10. The multifunctional vehicle lifting, steering, moving and obstacle crossing device according to claim 1, wherein the transmission assembly is one or more of a transmission shaft, a worm gear and worm, a gear set and a chain wheel and chain set; and the running assembly is a roller or a crawler wheel.

11. The multifunctional vehicle lifting, steering, moving and obstacle crossing device according to claim 1, wherein the control mechanism comprises a program control circuit, a wireless transmitter/receiver, a wired controller or a wireless controller and further comprises an angle inductor, a geomagnetic inductor and a video receiver; the program control circuit is respectively connected with the angle inductor, the geomagnetic inductor, the video receiver, a wireless transmitting and receiving system and a driving motor at each part or a rotating mechanism driver, a lifting mechanism driver and a running mechanism driver; the wired controller is mounted in a cab, and a circuit of the wired controller is connected with the program control circuit; and the wireless controller is a special remote controller or a mobile phone.

* * * * *